(12) United States Patent
Bach

(10) Patent No.: US 8,371,212 B1
(45) Date of Patent: Feb. 12, 2013

(54) CELL ASSEMBLY FOR USE IN A HIGH-PRESSURE CUBIC PRESS

(75) Inventor: Kevin C. Bach, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/299,028

(22) Filed: Nov. 17, 2011

Related U.S. Application Data

(63) Continuation of application No. 12/354,981, filed on Jan. 16, 2009, now Pat. No. 8,074,566.

(51) Int. Cl.
*B30B 15/34* (2006.01)
*F27B 5/14* (2006.01)

(52) U.S. Cl. .......... 100/38; 100/305; 100/102; 219/407; 373/127

(58) Field of Classification Search .............. 100/38, 100/92, 102, 305; 219/391, 406, 407, 427, 219/428, 429, 430, 431, 385; 373/111, 116, 373/118, 127, 134; 419/49, 52; 51/307, 51/309

See application file for complete search history.

(56) References Cited

U.S. PATENT DOCUMENTS

| | | | | |
|---|---|---|---|---|
| 715,507 | A * | 12/1902 | Potter | ............... 373/118 |
| 2,195,297 | A | 3/1940 | Engle | |
| 3,239,384 | A * | 3/1966 | Meyers | ............ 429/118 |
| 3,752,456 | A | 8/1973 | Larker | |
| 4,103,100 | A | 7/1978 | Kabayama et al. | |
| 4,247,735 | A | 1/1981 | Rigatti-Luchini | |
| 5,744,170 | A | 4/1998 | Hall | |
| 5,780,139 | A | 7/1998 | Carter et al. | |
| 5,858,525 | A | 1/1999 | Carter et al. | |
| 6,124,573 | A | 9/2000 | Hall et al. | |
| 6,338,754 | B1 | 1/2002 | Cannon et al. | |
| 7,128,547 | B2 | 10/2006 | Sung | |
| 8,074,566 | B1 * | 12/2011 | Bach | ................ 100/38 |
| 2002/0025354 | A1 | 2/2002 | Hall | |
| 2006/0032429 | A1 | 2/2006 | Sung | |
| 2006/0032431 | A1 | 2/2006 | Sung | |
| 2007/0157917 | A1 | 7/2007 | Sung | |

OTHER PUBLICATIONS

U.S. Appl. No. 11/545,929, filed Oct. 10, 2006, Bertagnolli, et al.
U.S. Appl. No. 12/354,981, filed Jan. 16, 2009, Bach.
U.S. Appl. No. 12/354,981, Mailed May 10, 2011, Office Action.
U.S. Appl. No. 12/354,981, Mailed Sep. 19, 2011, Notice of Allowance.

* cited by examiner

*Primary Examiner* — Jimmy T Nguyen
(74) *Attorney, Agent, or Firm* — Workman Nydegger

(57) ABSTRACT

In an embodiment, a cell assembly for use in a high-pressure cubic press comprises a substantially tubular heating element including a proximal end region having a proximal mouth, a distal end region having a distal mouth spaced from the proximal mouth, and a passageway extending between the proximal mouth and the distal mouth configured to receive at least partially receive at least one can assembly therein. A pressure transmitting medium extends about at least the substantially tubular heating element. A proximal electrical contact electrically contacts the substantially tubular heating element at the proximal end region thereof. A distal electrical contact electrically contacts the substantially tubular heating element at the distal end region thereof. A gasket medium defines a receiving space that receives at least the substantially tubular heating element and the pressure transmitting medium.

20 Claims, 8 Drawing Sheets

CELL ASSEMBLY FOR USE IN A HIGH-PRESSURE CUBIC PRESS

CROSS-REFERENCE TO RELATED APPLICATIONS

This application is a continuation of U.S. application Ser. No. 12/354,981 filed on 16 Jan. 2009 (now U.S. Pat. No. 8,074,566 issued on 13 Dec. 2011), the contents of which are incorporated herein, in their entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive polycrystalline diamond layer commonly known as a polycrystalline diamond table. The polycrystalline diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a layer of diamond particles adjacent to a surface of a cemented-carbide substrate and into a can assembly. The can assembly including the cemented-carbide substrate and layer of diamond particles therein may be surrounded by various different pressure transmitting media (e.g., salt liners), positioned in a graphite tube having graphite end caps disposed at respective ends of the graphite tube that forms a heater assembly, and finally embedded in a cube-shaped gasket medium (e.g., pyrophyllite). In an HPHT process used to form a PDC, anvils of an ultra-high pressure cubic press apply pressure to the cube-shaped gasket medium and the contents therein, while the cemented-carbide substrate and layer of diamond particles are controllably heated to a selected temperature at which sintering of the diamond particles is effected by passing a current through the graphite tube and end caps.

SUMMARY

Embodiments of the invention relate to cell assemblies for use in a high-pressure cubic press used for fabricating PDCs and methods of use. In an embodiment, a cell assembly for use in a high-pressure cubic press comprises a substantially tubular heating element including a proximal end region having a proximal mouth, a distal end region having a distal mouth spaced from the proximal mouth, and a passageway extending between the proximal mouth and the distal mouth configured to at least partially receive at least one can assembly therein. The at least one can assembly may hold a plurality of diamond particles positioned adjacent to a substrate that ultimately forms a PDC after being HPHT processed using the cubic press. A pressure transmitting medium extends about at least the substantially tubular heating element. A proximal electrical contact electrically contacts the substantially tubular heating element at the proximal end region thereof and does not extend over the proximal mouth thereof. A distal electrical contact electrically contacts the substantially tubular heating element at the distal end region thereof and does not extend over the distal mouth thereof. A gasket medium defines a receiving space that receives at least the substantially tubular heating element and the pressure transmitting medium.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to cell assemblies for use in a high-pressure cubic press used for fabricating PDCs and methods of use. The disclosed cell assemblies employ proximal and distal electrical contacts that respectively electrically contact a substantially tubular heating element at corresponding proximal and distal end regions thereof and do not contact unnecessary heating element components disposed within the substantially tubular heating element. Such a configuration for the cell assemblies may enable reducing the processing time and/or cost for fabricating PDCs.

Figure 1:
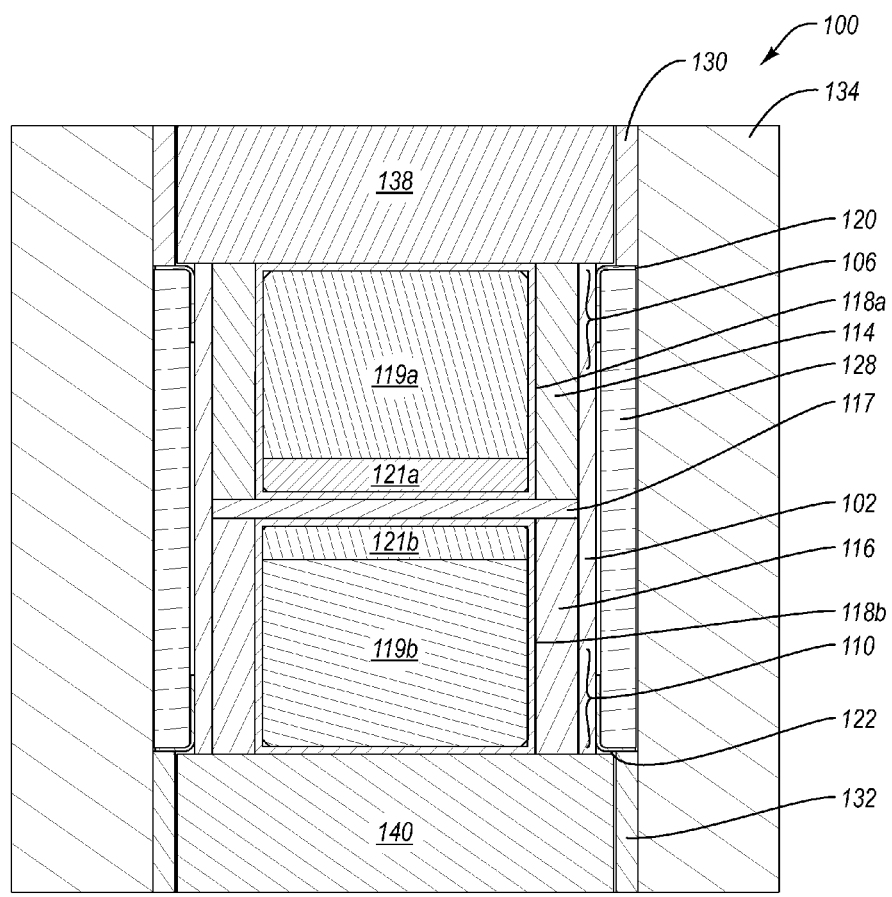
FIG. 1 is a cross-sectional view of an embodiment of a cell assembly enclosing two can assemblies each of which holds a plurality of diamond particles adjacent to a substrate.
Figure 2:
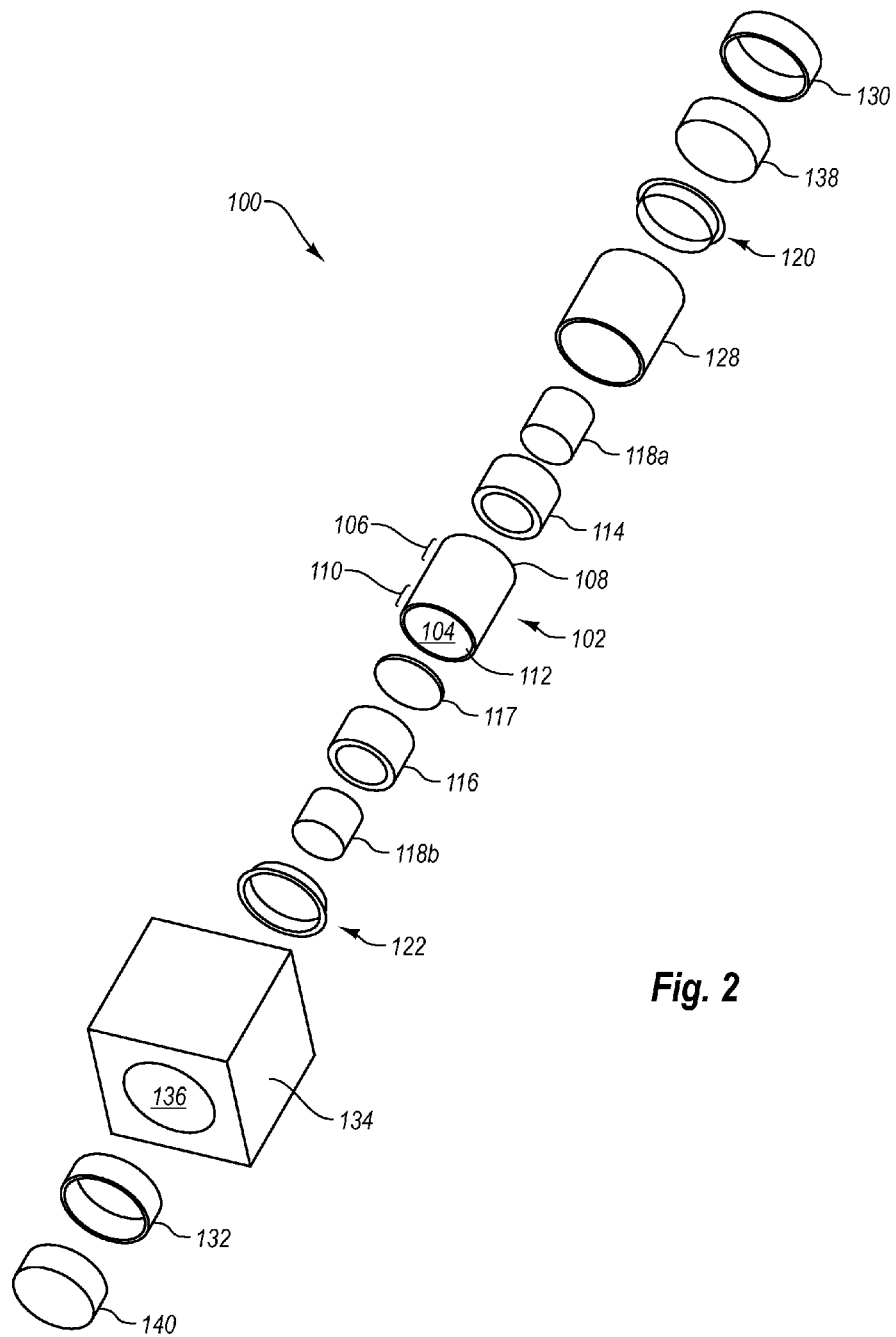
FIG. 2 is an exploded view of the cell assembly shown in FIG. 1.

FIGS. 1 and 2 are cross-sectional and exploded isometric views, respectively, of an embodiment of a cell assembly 100. The cell assembly 100 includes a substantially tubular resistance heating element 102 defining a passageway 104 (FIG. 2). As used herein, the term "substantially tubular" encompasses tubular elements having any cross-sectional geometry, such as a generally circular cross-sectional geometry or other non-circular cross-sectional geometry. The heating element 102 may comprise graphite or other suitable material. The heating element 102 includes a proximal end region 106 having a proximal mouth 108 (FIG. 2) and a distal end region 110 having a distal mouth 112 (FIG. 2), with the passageway 104 extending between the proximal mouth 108 and distal mouth 112. A pressure transmitting medium, such as first and second tubular salt liners 114 and 116 may be disposed in the passageway 104 of the heating element 102.

A disc 117 may separate the first and second tubular salt liners 114 and 116 to divide the receiving space 104 into two chambers that receive can assemblies 118a and 118b. For example, the disc 117 may be made from salt or other suitable material. Each can assembly 118a and 118b may include a corresponding substrate 119a and 119b (e.g., a cobalt-cemented tungsten carbide substrate) and a corresponding volume diamond particles 121a and 121b. Examples of suitable can assemblies and techniques for sealing such can assemblies are disclosed in U.S. patent application Ser. No. 11/545,929, which is incorporated herein, in its entirety, by this reference.

The cell assembly 100 further includes a proximal annular electrical contact 120 that extends about and electrically contacts a periphery of the proximal end region 106 of the heating element 102 and does not extend over the proximal mouth 108 thereof. The cell assembly 100 further includes a distal annular electrical contact 122 that extends about and electrically contacts a periphery of the proximal end region 106 of the heating element 102 and does not extend over the distal mouth 112 thereof. The proximal and distal annular electrical contacts 120 and 122 may each comprise a suitable electrically conductive and temperature-resistant material, such as titanium or a titanium alloy.

Figure 3A:
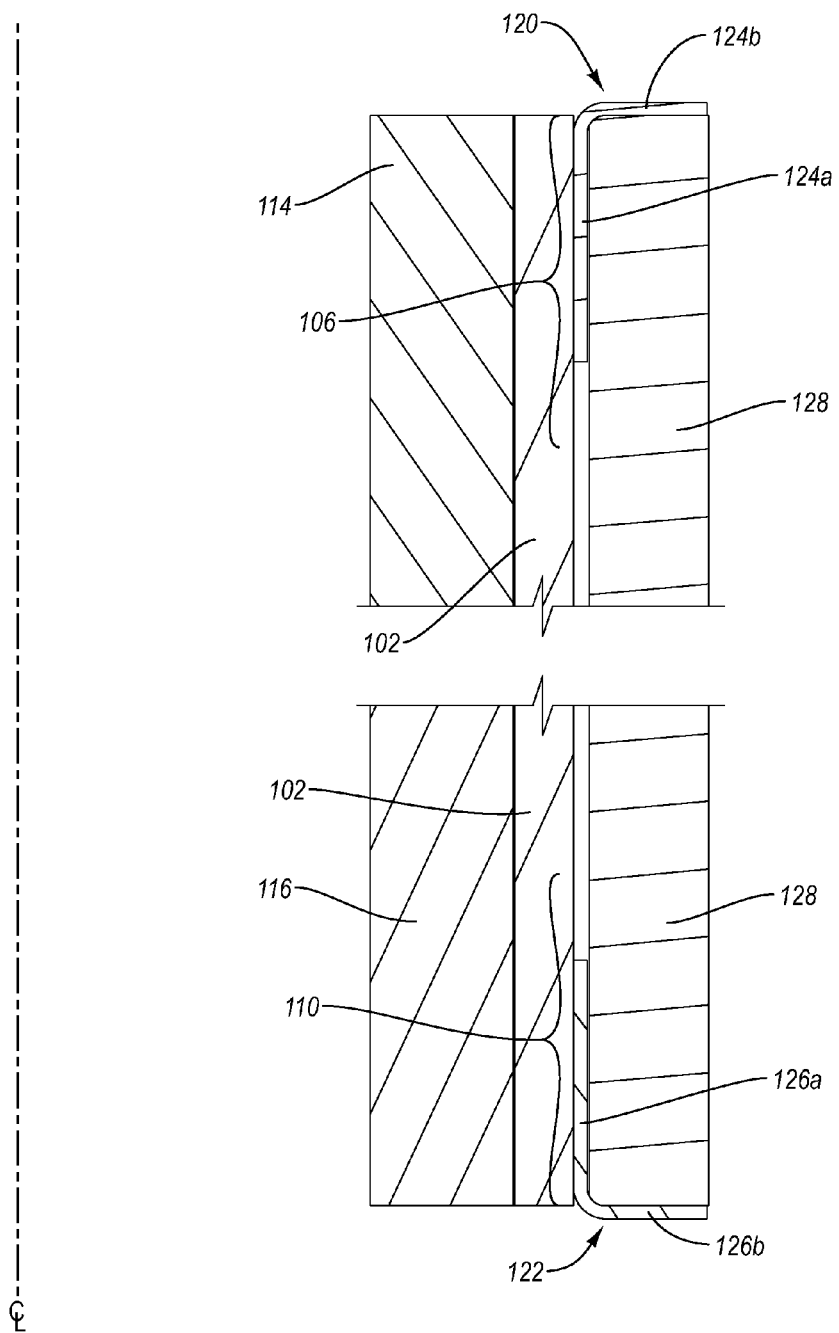
FIG. 3A is a partial, enlarged cross-sectional view of the cell assembly shown in FIG. 1 that details how the proximal and distal annular electrical contacts electrically contact the heating element.

FIG. 3A is a partial, enlarged cross-sectional view of the cell assembly 100 shown in FIG. 1 that details how the proximal and distal annular electrical contacts 120 and 122 electrically contact the heating element 102. In the illustrated embodiment, the proximal and distal annular electrical contacts 120 and 122 each exhibit a generally L-shaped cross-sectional geometry. The proximal annular electrical contact 120 includes a flange section 124a that extends in a lengthwise direction of the heating element 102 and electrically contacts the periphery of the proximal end region 106 thereof, and a flange section 124b that extends laterally outwardly away from the periphery. The distal annular electrical contact 122 includes a flange section 126a that extends in a lengthwise direction of the heating element 102 and electrically contacts the periphery of the distal end region 110 thereof, and a flange section 126b that extends laterally outwardly away from the periphery. In such a configuration, the proximal annular electrical contact 120 does need to extend over the proximal mouth 108 and the distal annular electrical contact 122 does need to extend over the distal mouth 112. Consequently, the substrates 119a and 119b may exhibit a thickness greater than about 8 mm, such as about 12 mm to about 35 mm, because valuable space in the cell assembly 100 is available. Accordingly, PDCs so-formed by HPHT processing the can assemblies 118a and 118b may yield suitably sized substrates 119a and 119b, which may improve manufacturability.

Figure 3B:
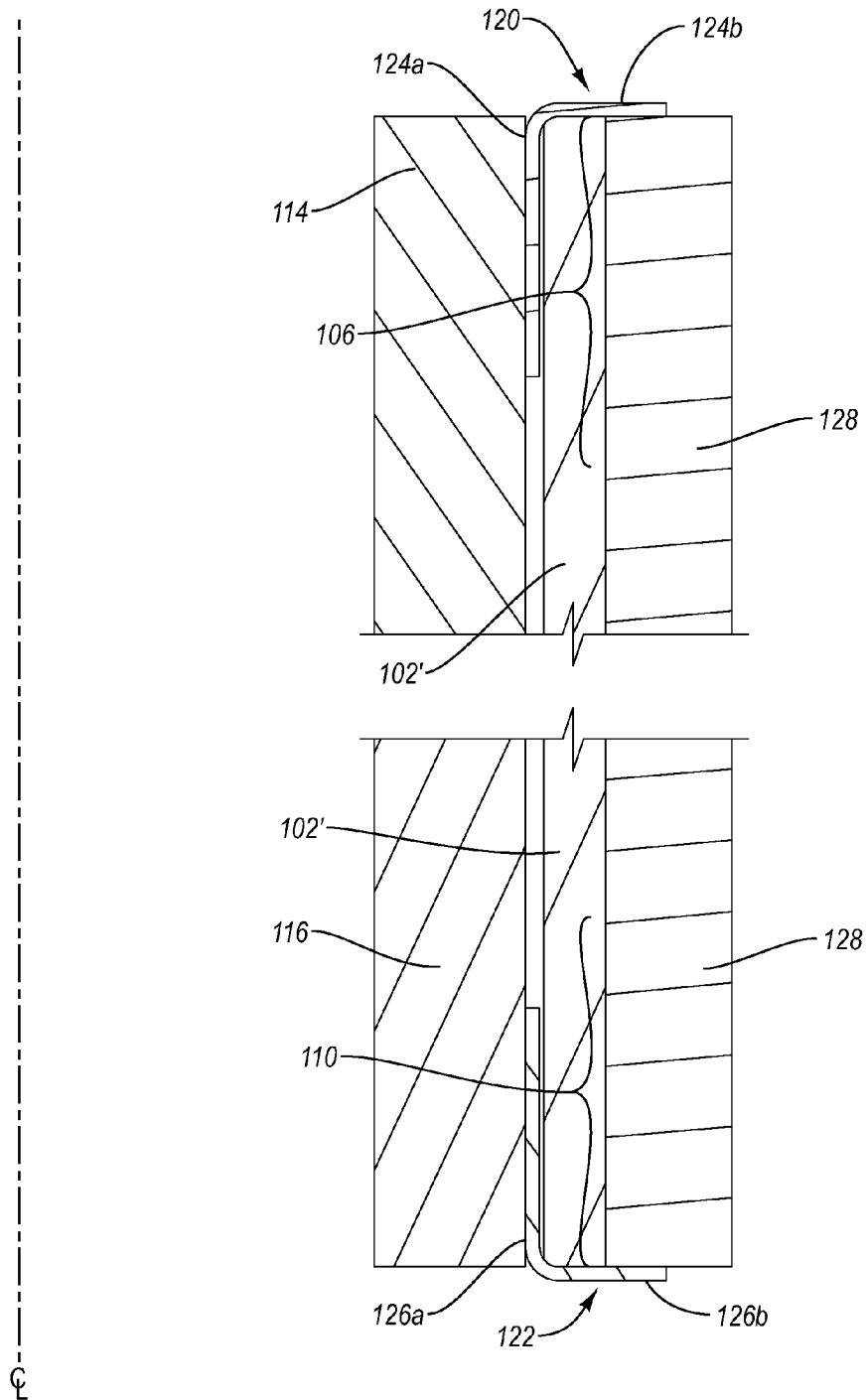
FIG. 3B is a partial, enlarged cross-sectional view of another embodiment for the proximal and distal annular electrical contacts that electrically contacts the heating element.

Referring to FIG. 3B, in another embodiment, the proximal annular electrical contact 120 may be positioned so that the flange section 124a thereof electrical contacts an interior periphery of a proximal end region 106' of a heating element 102' and the distal annular electrical contact 122 may be positioned so that the flange section 126a thereof electrical contacts an interior periphery of a distal end region 110' of a heating element 102'. In such an embodiment, the heating element 102' may exhibit a slightly larger inner diameter to accommodate the proximal and distal annular electrical contacts 120 and 122 disposed therein.

Figure 3C:
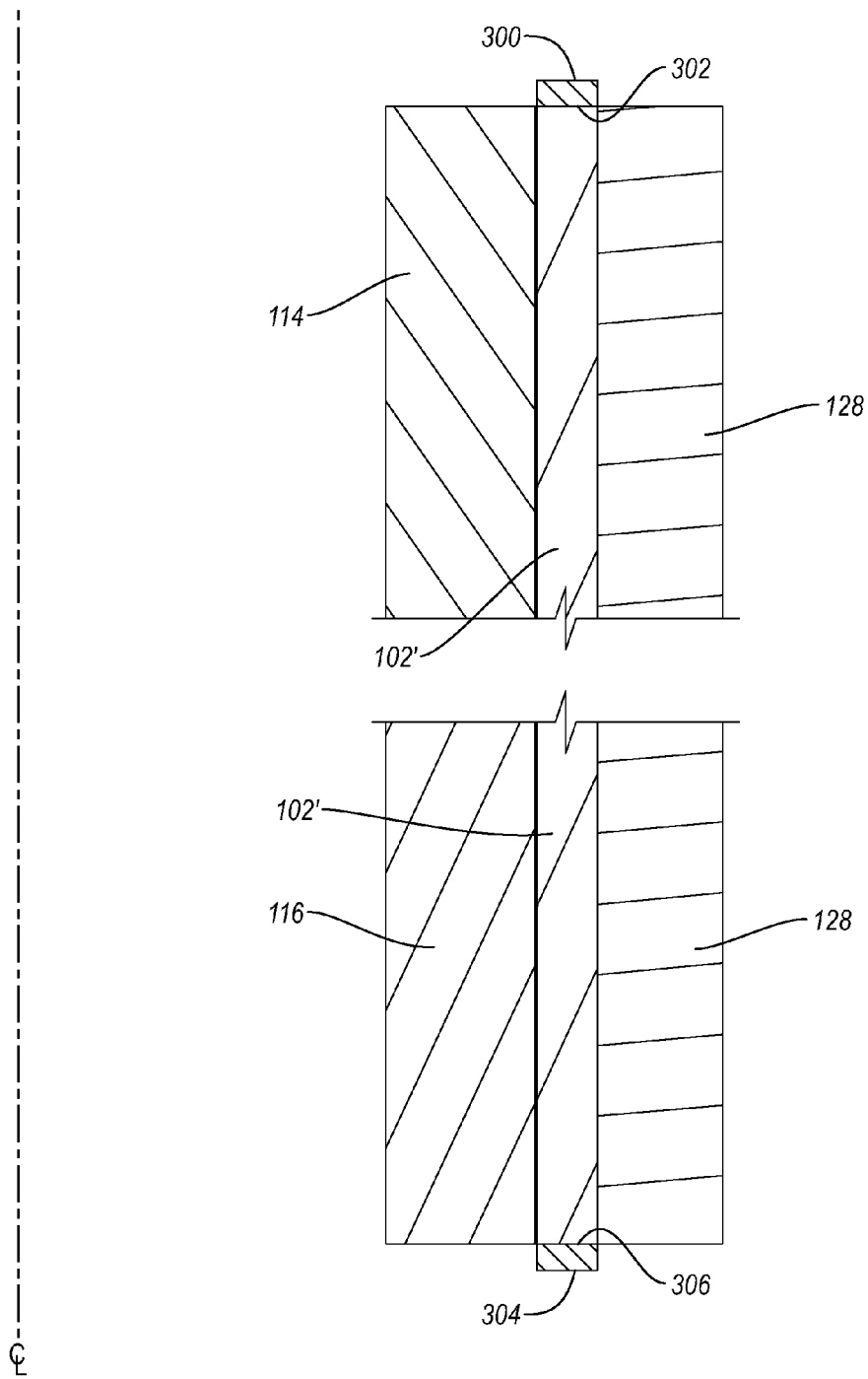
FIG. 3C is a partial, enlarged cross-sectional view of an embodiment for in which the proximal and distal annular electrical contacts shown in FIG. 3A are each replaced with a disc.

Referring to FIG. 3C, in yet another embodiment, the proximal annular electrical contact 120 and the distal annular electrical contact 122 may each be replaced with an electrical contact that is configured as a disc. In such an embodiment, a first disc-shaped electrical contact 300 may be positioned to electrically contact an end 302 of the heating element 102' and a second disc-shaped electrical contact 304 may be positioned to electrically contact an end 306 of the heating element 102'.

Referring again to FIGS. 1 and 2, a substantially tubular pressure transmitting medium 128, such as a tube made from salt, may receive and extend about the heating element 102, first and second tubular salt liners 114 and 116, disc 117, can assemblies 118a and 118b, and flange sections 124a and 126a of corresponding proximal and distal annular electrical contacts 120 and 122. A proximal anvil electrical contact 130 is disposed adjacent to the proximal end region 106 of the heating element 102 and electrical contacts the flange section 124b (FIG. 3) of the proximal annular electrical contact 120. A distal anvil electrical contact 132 is disposed adjacent to the distal end region 110 of the heating element 102 and electrical contacts the flange section 126b (FIG. 3) of the distal annular electrical contact 122. The proximal and distal anvil electrical contacts 130 and 132 may be made from steel or other suitable electrically conductive material.

The cell assembly 100 further includes a gasket medium 134 generally in the shape of a cube. The gasket medium 134 defines a receiving space 136 therethrough that receives the heating element 102, first and second tubular salt liners 114 and 116, disc 117, can assemblies 118a and 118b, and proximal and distal annular electrical contacts 120 and 122. The receiving space 136 may also at least partially receive the proximal and distal anvil electrical contacts 130 and 132. A gasket medium plug 138 is disposed in an opening 136 defined by the proximal anvil electrical contact 130 and a gasket medium plug 140 is disposed in an opening 138 defined by the distal anvil electrical contact 132. The gasket medium 134 and the gasket medium plugs 138 and 140 may comprise any suitable gasket material, such as any material disclosed in U.S. Pat. No. 6,338,754, which is incorporated herein, in its entirety, by this reference. Another example of a suitable material for the gasket medium 134 and the gasket medium plugs 138 and 140 is pyrophyllite, which is commercially available from Wonderstone Ltd. of South Africa.

Figure 4:
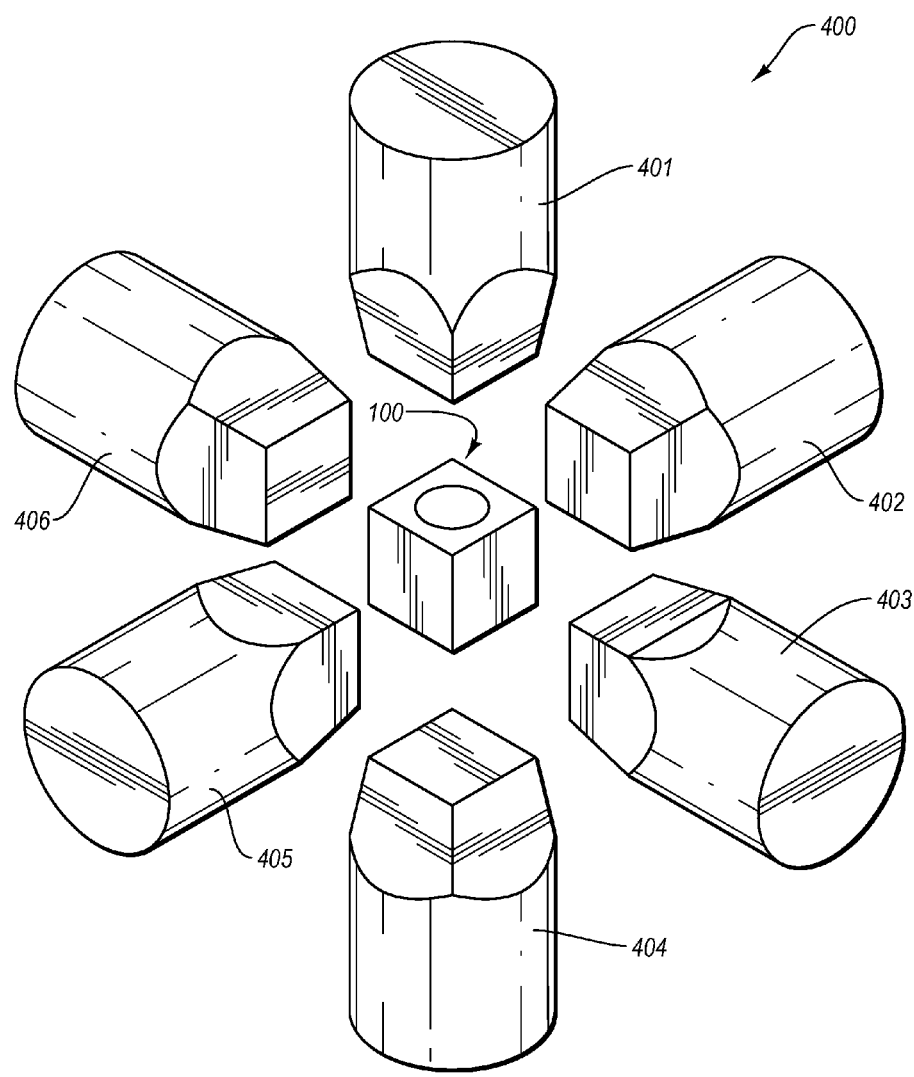
FIG. 4 is a partial isometric view of an ultra-high pressure cubic press configured to apply pressure to the cell assembly shown in FIG. 1 and simultaneously pass a current through the heating element shown in FIG. 1 to generate diamond stable HPHT conditions.

The use of the cell assembly 100 shown in FIG. 1 for fabricating two PDCs is explained with reference to FIG. 4, which is a partial isometric view of an ultra-high pressure cubic press 400 configured to apply pressure to the cell assembly 100 and pass a current through the heating element 102 to generate diamond stable HPHT conditions. In use, the cell assembly 100 including the can assemblies 118a and 118b therein is placed in a reaction zone of the ultra-high pressure press 400. A plurality of anvils 401-406 of the ultra-high pressure press 400 each applies a selected pressure to respective faces of the cell assembly 100. The anvils 401 and 404 also establish electrical contact with proximal anvil electrical contact 130 and the distal anvil electrical contact 132, and a selected current is controllably passed through the heating element 102 to thereby heat the contents of the can assemblies 118a and 118b. The heating may be sufficient to heat the contents of the can assemblies 118a and 118b to about 1200° C. to about 2200° C., while the anvils 401-406 apply a pressure to the contents of the can assemblies 118a and 118b of at least about 4 GPa, such as about 5 GPa to about 8 GPa. Subjecting the can assemblies 118a and 118b to the HPHT process results in two PDCs being formed. One PDC comprises the substrate 119a that is bonded to a PCD table formed from the diamond particles 121a that are sintered and another PDC comprises the substrate 119b that is bonded to a PCD table formed from the diamond particles 121b that are sintered. However, in other embodiments, the cell assembly 100 may be employed for fabricating one, three, or four or more PDCs of various shapes and sizes (e.g., PDC configurations other than the illustrated cylindrical configurations).

Referring again to FIGS. 1 and 2, the cell assembly 100 may be fabricated by disposing the can assemblies 118a and 118b along with the tubular salt liners 114 and 116 and disc 117 in the heating element 102 to form a heater sub-assembly. Further, the heater sub-assembly may be inserted into the pressure transmitting medium 128. Also, the proximal and distal annular electrical contacts 120 and 122 may be positioned adjacent to the corresponding proximal and distal end regions 106 and 110 of the heating element 102 until the flange sections 124b and 126b (FIG. 3) abut the pressure transmitting medium 128 to form a gasket sub-assembly. The gasket sub-assembly may be positioned into the receiving space 136 of the gasket medium 134. The proximal and distal anvil electrical contacts 130 and 132, along with the associated gasket medium plugs 138 and 140, may be inserted into the receiving space 136 so that they respectively electrical contact the corresponding proximal and distal annular electrical contacts 120 and 122.

Figure 5:
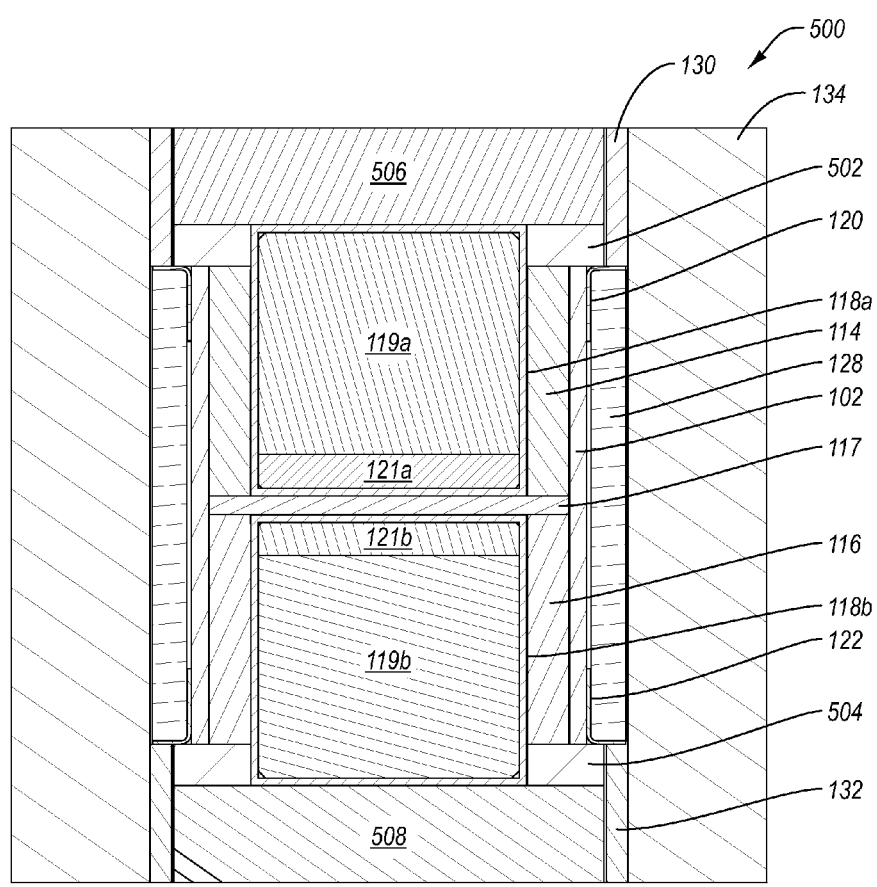
FIG. 5 is a cross-sectional view of another embodiment of a cell assembly.
Figure 6:
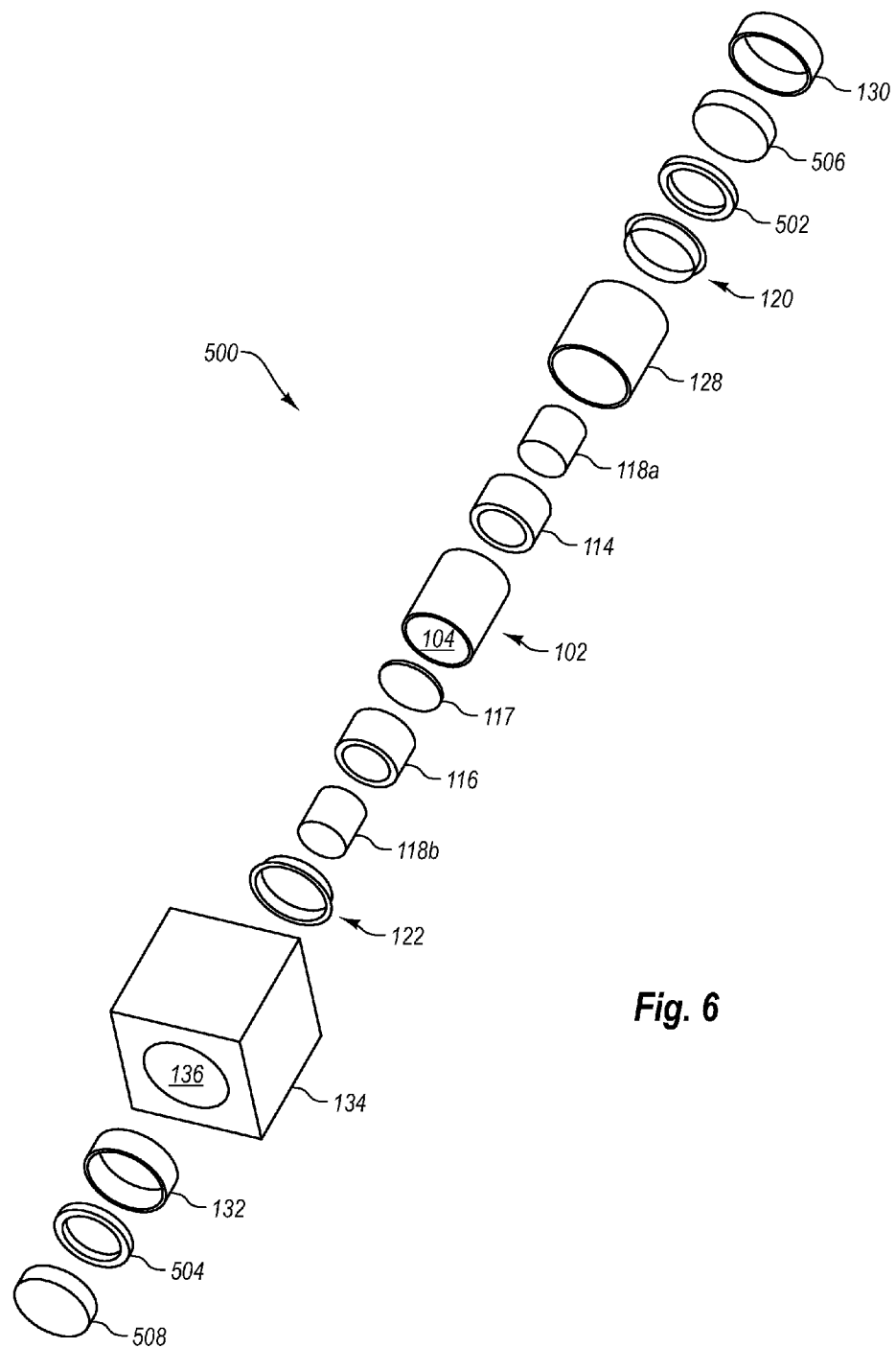
FIG. 6 is an exploded view of the cell assembly shown in FIG. 5.

FIGS. 5 and 6 are cross-sectional and exploded views, respectively, of another embodiment of a cell assembly 500. The cell assembly 500 includes many of the same components as the cell assembly 100 shown in FIG. 1. Therefore, in the interest of brevity, components in the cell assemblies 100 and 500 that are identical to each other have been provided with the same reference numerals, and an explanation of their structure and function will not be repeated unless the components function differently in the two cell assemblies 100 and 500.

A proximal annular washer 502 and a distal annular washer 504 made from any of the previously described gasket materials are provided. The proximal annular washer 502 is disposed within the receiving space 136 (FIG. 6) of the gasket medium 134, between the can assembly 118a and the proximal anvil electrical contact 130, and about an end of the can assembly 118a that projects out of the heating element 102. The distal annular washer 504 is disposed within the receiving space 136 (FIG. 6) of the gasket medium 134, between the can assembly 118b and the proximal anvil electrical contact 132, and about an end of the can assembly 118b that projects out of the heating element 102. The gasket medium plugs 138 and 140 of the cell assembly 100 shown in FIG. 1 are replaced with gasket medium plugs 506 and 508 that have a relatively smaller thickness and made from any of the previously described gasket materials. In such an embodiment, a thickness of each of the substrates 119a and 119b may be made greater than when the cell assembly 100 is employed because of the reduced thickness of the gasket medium plugs 506 and 508.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A cell assembly for use in a high-pressure cubic press, comprising:
    a substantially tubular heating element including:
        a proximal end region having a proximal mouth;
        a distal end region having a distal mouth spaced from the proximal mouth; and
        a passageway extending between the proximal mouth and the distal mouth;
    a pressure transmitting medium extending about at least the substantially tubular heating element;
    a proximal electrical contact electrically contacting the substantially tubular heating element at the proximal end region thereof;
    a distal electrical contact electrically contacting the substantially tubular heating element at the distal end region thereof;
    a gasket medium defining a receiving space that receives at least the substantially tubular heating element and the pressure transmitting medium;
    first and second can assemblies disposed in the passageway of the substantially tubular heating element; and
    a salt body disposed in the passageway of the substantially tubular heating element and separating the first and second can assemblies from each other.

2. The cell assembly of claim 1 wherein:
    the proximal electrical contact is configured as a proximal annular electrical contact including a flange section that electrically contacts the substantially tubular heating element at only a proximal periphery of the proximal end region, the proximal annular electrical contact does not extend over the proximal mouth of the substantially tubular heating element, the flange section of the proximal annular electrical contact extending axially along the substantially tubular heating element and disposed between the substantially tubular heating element and the pressure transmitting medium; and
    the distal electrical contact is configured as a distal annular electrical contact including a flange section that electrically contacts the substantially tubular heating element at only a distal periphery of the distal end region, the distal annular electrical contact does not extend over the distal mouth of the substantially tubular heating element, the flange section of the distal annular electrical contact extending axially along the substantially tubular heating element and disposed between the substantially tubular heating element and the pressure transmitting medium.

3. The cell assembly of claim 2 wherein the proximal and distal annular electrical contacts each exhibit a generally L-shaped cross-sectional geometry.

4. The cell assembly of claim 1, further comprising:
    wherein the proximal electrical contact is configured as a proximal annular electrical contact extending about the proximal periphery and electrically contacting the substantially tubular heating element along the proximal periphery thereof, the proximal annular electrical contact including a flange section extending radially outwardly from the proximal end region of the substantially tubular heating element;
    wherein the distal electrical contact is configured as a distal annular electrical contact extending about the distal periphery and electrically contacting the substantially tubular heating element along the distal periphery thereof, the distal annular electrical contact including a flange section extending radially outwardly from the distal end region of the substantially tubular heating element;

a proximal annular anvil electrical contact electrically contacting the flange section of the proximal annular electrical contact; and a distal annular anvil electrical contact electrically contacting the flange section of the distal annular electrical contact.

5. The cell assembly of claim 4 wherein the cubic cell pressure medium comprises a proximal plug disposed at least partially within an opening defined by the proximal annular anvil contact and a distal plug disposed at least partially within an opening defined by the distal annular anvil contact.

6. The cell assembly of claim 1 wherein the salt body is configured as a salt disc.

7. The cell assembly of claim 1 wherein the substantially tubular heating element comprises a substantially tubular graphite heating element.

8. The cell assembly of claim 1 wherein the substantially tubular heating element does not include additional heating element components disposed in the passageway thereof.

9. The cell assembly of claim 1 wherein the pressure transmitting medium comprises a substantially tubular salt liner in which the substantially tubular heating element is received.

10. The cell assembly of claim 1 wherein the pressure transmitting medium is configured to restrict movement of the proximal and distal electrical contacts in an axial direction of the substantially tubular heating element.

11. The cell assembly of claim 1 wherein the proximal and distal electrical contacts each comprise a flange section that abuts with the pressure transmitting medium to restrict movement thereof in an axial direction of the substantially tubular heating element.

12. The cell assembly of claim 1 wherein the gasket medium comprises at least one gasket material selected from the group consisting of a naturally occurring gasket material and a synthetic gasket material.

13. A method of forming a cell assembly, comprising:
disposing first and second can assemblies within a passageway of a substantially tubular heating element separated by a salt disc, wherein the passageway extends between a proximal mouth and a distal mouth, and wherein each of the first and second can assemblies holds a diamond volume located adjacent to a substrate;
electrically contacting a proximal electrical contact to the substantially tubular heating element at a proximal end region thereof;
electrically contacting a distal electrical contact to the substantially tubular heating element at a distal end region thereof; and
enclosing the first and second can assemblies, the substantially tubular heating element, the proximal electrical contact, and the distal electrical contact within a gasket medium to form the cell assembly.

14. The method of claim 13 wherein:
electrically contacting a proximal electrical contact to the substantially tubular heating element at a proximal end region thereof comprises sliding the proximal electrical contact over a periphery of the proximal end region of the substantially tubular heating element; and
electrically contacting a distal electrical contact to the substantially tubular heating element at a distal end region thereof comprises sliding the distal electrical contact over a periphery of the distal end region of the substantially tubular heating element.

15. The method of claim 13 wherein:
the gasket medium comprises a generally cubic body defining hole therethrough, and proximal and distal plugs received in the hole; and
enclosing the first and second can assemblies, the substantially tubular heating element, the proximal electrical contact, and the distal electrical contact within a gasket medium to form the cell assembly comprises contacting the proximal plug to the first can assembly and contacting the distal plug to the second can assembly.

16. The method of claim 13, further comprising:
electrically contacting a proximal anvil annular electrical contact with a flange section of the proximal electrical contact; and
electrically contacting a distal anvil annular electrical contact with a flange section of the distal electrical contact.

17. The method of claim 13, further comprising:
applying pressure to the cell assembly in an ultra-high pressure press; and
passing a current through the substantially tubular heating element to heat contents of the first and second can assemblies.

18. The method of claim 13 wherein the substantially tubular heating element exhibits a generally circular cross-sectional geometry.

19. A cell assembly for use in a high-pressure cubic press, comprising:
a substantially tubular heating element including:
a proximal end region having a proximal mouth and a proximal periphery;
a distal end region having a distal mouth spaced from the proximal mouth and a distal periphery; and
a passageway extending between the proximal mouth and the distal mouth;
a pressure transmitting medium extending about at least the substantially tubular heating element;
a proximal annular electrical contact extending about the proximal periphery and electrically contacting the substantially tubular heating element along the proximal periphery thereof, the proximal annular electrical contact including a flange section extending radially outwardly from the proximal end region of the substantially tubular heating element;
a distal annular electrical contact extending about the distal periphery and electrically contacting the substantially tubular heating element along the distal periphery thereof, the distal annular electrical contact including a flange section extending radially outwardly from the distal end region of the substantially tubular heating element;
a proximal annular anvil electrical contact electrically contacting the flange section of the proximal annular electrical contact;
a distal annular anvil electrical contact electrically contacting the flange section of the distal annular electrical contact;
first and second can assemblies disposed in the passageway of the substantially tubular heating element;
a salt disc disposed in the passageway of the substantially tubular heating element and separating the first and second can assemblies from each other; and
a gasket medium defining a receiving space that receives at least the substantially tubular heating element and the pressure transmitting medium.

20. The cell assembly of claim 19 wherein:

the proximal annular electrical contact comprises an additional flange section electrically contacting the substantially tubular heating element along the proximal periphery thereof; and the distal annular electrical contact comprises an additional flange section electrically contacting the substantially tubular heating element along the distal periphery thereof.

\* \* \* \* \*